April 26, 1927.                                                                1,626,338
W. O. HEUBLEIN
AMPULLA COMPOSED OF SEVERAL COMPARTMENTS ADAPTED FOR
THE PURPOSE OF RADIOTHERAPEUTICS
Filed Jan. 28, 1926
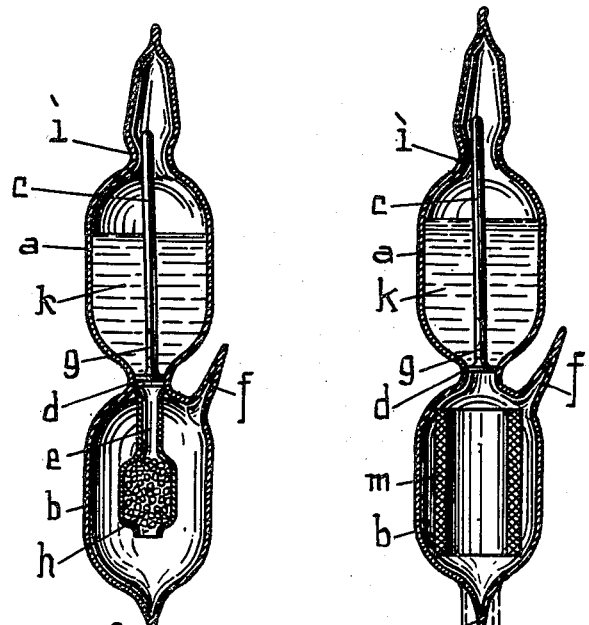
Fig.1.        Fig.2.
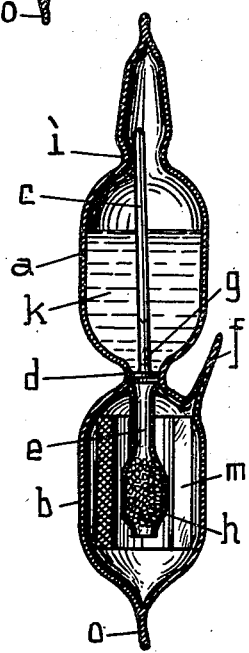
Fig.3.
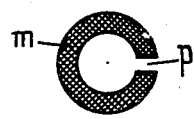

Patented Apr. 26, 1927.

1,626,338

UNITED STATES PATENT OFFICE.

WILHELM OSKAR HEUBLEIN, OF FRANKFORT-ON-THE-MAIN, GERMANY.

AMPULLA COMPOSED OF SEVERAL COMPARTMENTS ADAPTED FOR THE PURPOSE OF RADIOTHERAPEUTICS.

Application filed January 28, 1926, Serial No. 84,306, and in Germany January 12, 1925.

This invention has for its object to create for the use by physicians a substitute for a physical radium apparatus consisting of an ampulla composed of several compartments designed to be used for radiotherapeutics and combining the advantages of the radium bath and the treatment by radium rays.

According to the invention an ampulla composed of several compartments contains in the lower compartment the dry radioactive substance or an emanation occluded by suitable porous or colloidal bodies. In the first mentioned case only such radioactive substances are used which are capable to form, with physiological sodium chloride solution, bodies similar to the thorium —X or to the radium-selenate from the motherlye, e. g. representing a decay- or solution-product. The upper compartment of the ampulla contains carbonic water or free pure distillated water, physiologic sodium chloride solution or preferably synthetic serum.

According to the duration of the action of the injection-liquid on the radioactive decay- or solution-product a weaker or stronger radioactive injection solution is obtained. At the absorption of the emanation suitable filtering materials as zeolites, dry silicium hydrate, acetyle-cellulose, bone-black or blood-black and the like are enclosed as absorbent in the lower compartment of the ampulla, preferably in the shape of cylindrical bodies. After the emanation-containing media, as for instance air or water, have been conducted through the lower compartment of the ampulla, the absorption-materials in this compartment become emanation-containing in such a manner that the degree of efficiency of the occluding emanation amounts to 90% and more of the corresponding radium-preparate in the form of hard-radiating radium C. It is generally known that at the dissolving of a radium-salt in water the separation of a radioactive substance takes place. The decay-product escapes in gaseous state and represents the emanation. The two above indicated cases can therefore be combined in such a manner that the dry radioactive substance enclosed in the ampulla is surrounded by an envelope of filtering material. This envelope serves to intercept the ion-currents of the gaseous emanations which are produced. If a combined ampulla of this type composed of several compartments is to be used, the injection liquid is made to flow into the lower evacuated compartment, so that the solution gradually develops thorium —X from the motherlye (for instance radium thorium) a decomposing of the thorium —X taking place at the same time. This thorium —X, isotope with radium and mesothorium, goes over into the thorium emanation which, by the colloidal filtering envelope, is almost quantitatively occluded owing to its extraordinary absorption capability. The radioactive equilibrium state is very much stabilized by this arrangement.

The ampulla just prepared is adapted to be used for the purposes of radium bath and radium ray treatment.

An embodiment of the invention is illustrated in the accompanying drawing, in which:—

Fig. 1 shows an ampulla comprising two compartments containing in the lower compartment a reservoir $e$ for the radioactive substance.

Fig. 2 shows a similar ampulla containing in the lower compartment an absorption cylinder $m$.

Fig. 3 shows an ampulla composed of two compartments and containing a reservoir and an absorption cylinder in the lower compartment.

$a$ is the ampulla-compartment for the liquid medicament and $b$ is the ampulla-compartment in which solid radioactive substance and gaseous emanation are stored, said emanation being also called niton. Between the two ampulla-compartments a vaulted partition $c$ is arranged which acts as a breaking lever. In order to produce the connection between the ampulla compartments $a$ and $b$ the vaulted partition $c$ is adapted to be broken off at the point $g$ so that the two compartments of the ampulla communicate with one another through a narrow neck $d$.

In the form of construction shown in Fig. 1 a receptacle $a$ of glass is arranged in the compartment $b$ of the ampulla and serves to store the radioactive substance $h$. This compartment of the ampulla is preferably evacuated. If the lever $c$ is broken off the medicament flows through the neck $d$ into the receptacle $e$ filled with radioactive substances and collects in the compartment $b$. A small portion of the solid radio-containing substance $h$ is dissolved by the liquid medicament flowing through the glass receptacle $e$. By the liquid $k$ standing for a longer or shorter time in the compartment $b$ solutions of different degrees of efficiency are obtained. The liquid is withdrawn for injection through the opening produced by breaking off the pointed extension $f$ of the lower compartment. In the ampulla compartment $b$, as shown in Fig. 2, colloids with high absorbing capability for radio-emanation are enclosed. Bodies which have a large surface are specially adapted for this purpose. In the drawing a hollow cylindrical body $m$ of plastic blood-black or silicic acid jelly is shown. The compartment $b$ of the ampulla must be evacuated in order that the material transport of the ion rays is reduced. The charging of the absorption body $m$ is effected in a simple manner by conducting through the glass tube $s$ emanation-containing media, for instance gases or liquids, and by letting them flow out through the pointed extension $f$. After the saturation the pointed extension $f$ is closed by melting, the ampulla $b$ is evacuated and also closed at $c$ by melting.

In the form of construction shown in Fig. 3, the compartment $b$ of the ampulla is fitted in a similar manner as in the forms of construction of Figs. 1 and 2.

$e$ is the glass vessel containing the radioactive substance and $m$ is the absorption cylinder.

In order to enable an easy withdrawing through the extension $f$ of the liquid to be injected the cylindrical body $m$ is slit at the side turned towards this pointed extension (Fig. 3).

From the forms of construction described and shown by way of example results that:—

1.—The ampulla composed of several compartments can be utilized directly for treating swellings with light rays owing to the decomposition of the gaseous radio-emanation and that—

2.—It is adapted to supply injection-liquids containing radium emanation and that—

3.—It produces from the motherlye solution-products similar to thorium —X which products are however themselves not yet decay-products of the emanation orders. Such medicaments form the emanation only in the injected body and traverse the same with the highest dose of rays. To avoid as much as possible losses by radiation from the radioactive substance and from the emanation the lower compartment of the ampulla is preferably silver-coated or copper-coated or protected by an aluminium envelope.

Although ampullæ composed of two compartments are shown in the figures of the drawings each part of the ampulla might evidently be used separately or in connection with an injection-syringe. The upper compartment of the ampulla may be further constructed so that the injection-liquid can flow into the lower evacuated compartment without coming in contact with the atmospheric air.

I claim:—

1. An ampulla composed of several compartments adapted for the purposes of radio therapeutics, comprising in combination a lower compartment containing an absorbent for radio emanation consisting of bodies retaining radioactive substances, an upper compartment containing a liquid which contains for instance free, dissolved carbonic acid, a partition separating the said two compartments, and means for destroying said partition to make said compartments communicate with one another so that the liquid flowing from the upper compartment into the lower compartment forms directly radium emanations.

2. An ampulla composed of several compartments adapted for the purposes of radio therapeutics, comprising in combination a lower compartment containing an absorbent for radio emanation consisting of suitable absorption substances silicic acid hydrates, zeolite, acetyl cellulose, plastic blood-black and the like in the shape of coarse grains, an upper compartment containing a liquid which contains for instance free, dissolved carbonic acid, a partition separating the said two compartments, and means for destroying said partition to make said compartments communicate with one another so that the liquid flowing from the upper compartment into the lower compartment forms solution- and decay-products similar to the thorium X.

3. An ampulla composed of several compartments adapted for the purposes of radio therapeutics, comprising in combination a lower compartment containing an absorbent for radio emanation consisting of suitable absorption substances silicic acid hydrate, zeolite, acetyl cellulose, plastic blood-black and the like in the shape of coarse grains, an upper compartment containing a liquid which contains for instance free, dissolved carbonic acid, a partition separating the said two compartments, and means for destroying said partition to make said compartments communicate with one another so that the liquid flowing from the upper compartment into the lower compartment forms solution- and decay-products similar to the radium-selenate.

4. An ampulla composed of several compartments designed for radium therapeutics as claimed in claim 1, in which the compartment which contains the radioactive substance is silver-coated to prevent losses from radiation.

5. An ampulla composed of several compartments designed for radium therapeutics as claimed in claim 1, in which the compartment which contains the radioactive substance is copper-coated to prevent losses from radiation.

6. An ampulla composed of several compartments designed for radium therapeutics as claimed in claim 1, in which the compartment which contains the radioactive substance is covered with an aluminium envelope to prevent losses from radiation.

In testimony whereof I affix my signature.

WILHELM OSKAR HEUBLEIN.